United States Patent Office

3,234,006
Patented Feb. 8, 1966

3,234,006
CONDITIONING AGENT AND HYGROSCOPIC PARTICLES CONDITIONED THEREWITH
Edgar W. Sawyer, Jr., Metuchen, and Homer A. Smith and Robert W. Wert, Berkeley Heights, N.J., assignors to Minerals & Chemicals Philipp Corporation, Menlo Park, N.J., a corporation of Maryland
No Drawing. Filed Mar. 28, 1962, Ser. No. 183,063
8 Claims. (Cl. 71—59)

This invention relates to conditioning particles of hygroscopic material which normally tend to coalesce and cake during storage due to the effects of moisture, temperature and/or pressure and relates especially to a novel composition which, when applied to hygroscopic particles, especially fertilizer particles, prevents their coalescence and caking during storage.

The caking of fertilizer and other hygroscopic salts during storage presents serious difficulties to the producer and ultimate user. Fertilizer materials which cake are not amenable to usual bulk storage and handling techniques and after storage they cannot be spread with mechanical distribution devices. The prevent or minimize caking of hygroscopic salts, a variety of methods has been suggested and put into practice. One of the most noteworthy has been the production of fertilizer salts in the form of regularly sized granules and prills rather than in the powdered form in which there would be more sites for intercrysalline growth with resultant caking of the salt particles. While granules are generally less prone to cake than powders of the same composition, there are many types of fertilizer granules and prills, especially those high in water-soluble nitrogen, which from hard cakes when stored in moist environments. Several methods have met with success in preventing caking of a limited group of granular salts. Thus, for example, a limited group of fertilizer salts can be effectively conditioned by coating individual particles of the salt with about 2% to 5% of powdered absorptive solids such as diatomaceous earth, various clays or limestone. These conditioning agents can occasionally be used with some success in conditioning high nitrogen analysis fertilizer granules, such as ammonium nitrate prills and 10–10–10 mixed fertilizer granules, provided the granules have previously been dried to an exceptionally low moisture content, e.g., a moisture content of say 0.1% to 0.5%. Drying fertilizer salts to a moisture content less than about 1% adversely effects the manufacturing cost of the fertilizer. Consequently, the cost involved in conditioning high nitrogen fertilizer salts with powdered sorbents is not practical. Moreover, the results frequently leave much to be desired.

Still another approach to conditioning hygroscopic salts involves providing a hydrophobic coating on the surface of salt particles to curtail absorption of water by the granule. In accordance with the teachings of U.S. 2,702,747 to Studebaker, the agent that is applied to ammonium nitrate prills to provide a moisture barrier around the salt particles is a clay that has been rendered organophilic by chemical reaction of the clay with an organic compound. A suitable organophilic clay is obtained by chemically replacing inorganic cations of clay having high bass exchange capacity, such as Wyoming bentonite, with the organic cation of a hydrophobic amine containing nitrogen in penetavalent state to form an onium clay in which an amine cation is an integral part of the clay lattice. The clay containing exchangeable inorganic cations is slurried in water and the hydrophobic amine containing pentavalent nitrogen is incorporated into the slurry. The onium clay reaction product precipitates out of the aqueous reaction medium and is filtered and dried. The quantity of onium clays recommended for use in conditioning ammonium nitrate prills is at least 20 lbs./ton of prills. However, the recommended quantity is about 70 lbs./ton of prills, a quantity of conditioner which substantially increases the cost of the finished prills. Moreover, to be effective, the prills that are conditioned with onium clays must be substantially moisture free.

It has also been suggested to coat hygroscopic granules and prills directly with extremely small quantities, e.g., ½ to 2 lbs./ton, of hydrophobic cationic organic compounds. For example, it has been suggested to coat the surface of high nitrogen analysis salts with hydrophobic fatty amines to curtail absorption of water by the granules. To accomplish this result, the fatty amine must be provided as an extremely uniform coating on the granules in order to be effective even when the amine is employed at a desirable level. To provide uniform distribution of the extremely small quantity of fatty amine conditioning agent or granules or prills of a soluble fertilizer salt, the amine is coated on the fertlizer granules by spraying fertilizer granules with a heat liquified amine or a solution of amine in organic solvent, such as oil. Usually the fertilizer granules are heated and agitated during the spraying operation. Since the fatty amines have very limited water solubility, the cost of drying granules coated with an aqueous solution of amine would be prohibitive. In commercial operations it is extremely difficult to insure the uniform distribution of the small quantity of amine on the fertilizer granules. Promising laboratory results have not been translated into successful commercial scale operations because of the inability to provide a sufficiently uniform amine coating on the surface of the salt particles with commercial spraying devices and material handling equipment.

Accordingly, a principal object of this invention is the provision of an improved coating agent for conditioning particles of hygroscopic salt material, especially high nitrogen analysis fertilizer salts, which conditioning agent avoids difficulties inherent in the use of prior art conditioning agents.

A more particular object of this invention is the provision of improved means and method for uniformly applying a hydrophobic amine conditioning agent to those fertilizer granules which are amenable to conditioning with said amine.

A more specific object of this invention is the provision of a novel clay product which is extremely effective when coated on particles of fertilizer salts in preventing or curtailing caking of such particles.

A further object of this invention is the provision of a clay product of the type mentioned above which has satisfactory adhesion to fertilizer salt particles.

Another object is an improved method for conditioning particles of hygroscopic salt material which obviates the need for spraying devices.

Still another object is the provision of improved cake-resistant fertilizer salt compositions.

Further objects and advantages will be readily apparent.

This invention results from the surprising and unexpected discovery that a hydrophobic clay obtained by dry coating certain clay, hereafter described, with an oil solution of hydrohobic amine containing trivalent nitrogen is markedly superior as a conditioning agent to a clay which has been converted into onium form by chemical reaction of the clay with an organic base containing pentavalent nitrogen.

Stated briefly, in accordance with the subject invention, an improved conditioning agent in the form of a free-flowing powder is obtained by dry coating microscopic particles of a particular type of montmorillonite clay, namely, sodium montmorillonite clay (e.g., Wyoming bentonite) with a small amount of a solution of a hydrophobic aliphatic amine in an oleaginous solvent for the amine, said amine being a primary n-aliphatic monoamine having from 8 to 22 (and preferably 12 to 18) carbon atoms and containing nitrogen in trivalent state.

The coated clay product is dusted on the surface of hygroscopic granules or prills, especially particles of fertilizer salts high in available nitrogen, and adheres tenaciously thereto. The resultant coated granules resist caking when subjected during storages to conditions of moisture and/or pressure which would normally cause the hygroscopic particles to set up into hard cakes or so-called "tombstones." While certain coated granules may form lumps when subjected to pressure and/or high humidity conditions for prolonged times, normally such lumps are friable and can be broken up merely by dropping the bagged material to the ground from a height of a few feet. This physical condition is considered to be satisfactory by most fertilizer users. The coated clay composition of this invention has been found to prevent caking of materials such as ammonium nitrate prills when the prills are subjected to storage conditions under which most prior art conditioners are of little or no benefit in preventing caking.

It has been found, moreover, that when an oily solution of fatty amine is precoated on sodium montmorillonite clay, in accordance with this invention, the resultant composition is generally considerably more effective in curtailing caking of hygroscopic granules than the same quantity of oily amine solution applied directly to the surface of the granules by spraying. In fact, in most cases the precoated clay will be more effective than oily amine solution would be if the solution were sprayed directly onto surfaces of granules in amount substantially greater than that present with the clay. It has been found, for example, that ammonium nitrate prills having a 1% moisture content resisted caking when conditioned with only 1 lb./ton of oily solutions of mixed fatty amines which had been precoated on Wyoming bentonite. However, caking and marked surface set occurred when the prills were sprayed with as much as 2 lbs./ton of the same amine solution. Caking of the prills also occurred when the prills were coated with various onium bentonite clays. Thus, the presence of the Wyoming bentonite with the amine and oil gives results not obtainable without the use of the clay or with the clay in onium form. Moreover, tests carried out with another montmorillonite mineral, namely, calcium montmorillonite, indicate that the beneficial results mentioned above depend on both the selection of a montmorillonite mineral containing sodium as the exchangeable cation and the use with said mineral of an oil solution of amine.

The clay material employed in carrying out this invention is a material which possesses some, but very limited, sorptive capacity. This material is believed to serve principally as an agent to transfer an active conditioning chemical, namely, an oil solution of a hydrophobic amine, to the surface of particles of hygroscopic salt material. Thus, it appears that when the clay composition is applied to fertilizer granules, the amine solution originally present on the minute clay crystals migrates during storage onto the surface of the fertilizer granules in response to the action of any one or a combination of the following factors: mechanical pressure, heat and moisture. The clay crystals are extremely small as compared with granules of fertilizer salts and the clay crystals provide a strikingly larger exposed surface on a weight basis than do the relatively large fertilizer granules. Gradual release and transfer of amine solution from a multiplicity of sites on a plurality of individual microscopic clay crystals surrounding the fertilizer granules would appear to permit a more uniform distribution of the solution on the fertilizer granules than could be effected by spraying the amine solution directly onto the granules with commercial spraying devices. This would account for the fact that smaller quantities of amine can be employed when the amine has been precoated on the clay. Obviously, if the clay particles serve as a temporary carrier or transfer agent for the amine conditioning agent, the bond between the conditioning agent must be for the most part an impermanent one. The affinity of the amine for the surface of the salt granules, especially moist granules, must exceed the affinity of the amine for the clay. That the transfer does occur when conditioning fertilizer salts, in accordance with this invention, is evidenced by the fact that highly absorptive minerals, such as attapulgite clay, calcium montmorillonite and talc, which have a greater affinity for the oily amine solution than sodium montmorillonite, are wholly ineffectual when substituted for the sodium montmorillonite. The coated clay compositions of this invention have a strong tendency to spread on the surface of a saturated ammonium nitrate solution while a variety of other organophilic clays, including onium clays, do not possess this property. This fact indicates that the oil solution of amine is transferred from clay to the conditioned granules. The apparent necessity for the use of oily solvent in conjunction with the amine may be explained by the role of the oil in maintaining the amine in liquified transferable condition and also in curtailing undesirable chemical or physical affixation of the amine to the clay, as by ion-exchange.

From this brief description of the clay conditioning agent of this invention and its probable mode of operation, it will be readily apparent that the dry coated clay conditioning agent of this invention differs fundamentally in nature from onium reacted clay conditioning agents of the prior art, as described in U.S. 2,702,747 to Studebaker. In contrast with prior art onium clays in which the amine cation is an integral part of the clay lattice, an amine is only loosely held by the clay in the coated clay product of this invention. It will be shown hereafter that onium clays are extremely poor conditioning agents as compared with the products made in accordance with this invention. Likewise, the conditioning agent of this invention differs in principle and nature from other prior conditioning agents in the form of hydrophobic particulate matter, such as the wax or oil coated natural mineral dusts described in U.S. 2,523,420 to Burrage. The latter, like onium clays, merely provide a hydrophobic surface coating on hygroscopic particles to which they are applied. The hydrophobic materials employed in coating the mineral particles are not surface active and they do not wet and spread on the surface of the salt particles being conditioned, as do the coating materials employed in carrying out this invention.

We are also aware that it has been suggested in U.S. 2,539,012 to Diamond to use any one of several types of inorganic filler particles coated with hydrophobic amines or other surfactants for conditioning sodium chloride. These particles are used in conjunction with magnesium stearate which is applied directly onto the surface of the salt particles. The filler particles merely perform their usual function, which is to improve the ease with which the salt particles flow. It is the magnesium stearate which is coated directly on the salt particles that functions to prevent caking of the salt particles. The amine or equivalent nonionic or anionic surfactant present on the filler particles serves merely as an ingredient to prevent the formation of a magnesium stearate scum by dispersing the stearate soap when the coated sodium chloride is dissolved in water. In other words, the only function of the surfactant is to disperse an insoluble soap that is employed with the amine or other surfactant, and the amine or other surfactant is not transferred to the salt particles during storage (as in fertilizer compositions of this invention).

In putting this invention into practice, the total quantity of oil solution of amine that is applied to the sodium montmorillonite does not exceed about 10% of the dry clay weight (determined by heating the clay to constant weight at about 220° F.). When the coating agent is used in greater amount, the free-flowing property of the clay is impaired and the coated material cannot be uniformly disseminated on the particles of fertilizer salts.

The coating agent loses much of its effectiveness when used in amount less than about 1% of the clay weight. Preferred is the use of coating agent in amount within the range of about 2% to 8% of the clay weight, with the range of about 3% to 6% being especially preferred for economic reasons. The proportions of amine to oily solvent in the coating agent is usually within the range of 15 to 85 parts by weight of amine to 85 to 15 parts by weight of oily solvent, preferably from about 30 to 60 parts amine to about 74 to 40 parts oil. The oily solvent is preferably employed in amount sufficient to maintain the amine in liquid condition at ambient temperature (e.g., 70° F.) or temperatures of application (up to 150° F.). The optimum quantity of oil will vary with the amine and nature of the oil solvent.

It is also within the scope of this invention to incorporate an extremely small quantity of an oil-compatible noncationic surface active agent into the oily amine coating solution before adding the solution to the clay for the purpose of improving the ease of coating the solution onto the clay. The use of such material is optional only and excellent results can be expected without employing the surfactant. When certain nonionic surfactants, such as condensation products of ethylene oxide with fatty acids, are employed, they also produce the desirable result of reducing the amount of fumes produced by the amines when they are coated on the clay. The nonionic or anionic surfactant can be used in amount of about 0% to 15% of the weight of the amine and is preferably used in amount within the range of about 1% to 3% of the weight of the amine.

In producing the anticaking agent of this invention, the dry clay can merely be dry blended at room temperature with a solution of a hydrophobic amine in oil in a blending mill and the mixture pulverized. The preferred method is to drip the amine solution, heat liquified when necessary, onto the dry clay in a blending device, agitate the ingredients and mill the ingredients to obtain a product which is substantially (e.g., at least about 98% by weight) minus 325 mesh (44 microns). In practice, this may be done by metering the liquid amine solution into a screen mill into which clay is metered while grinding. It may be advantageous to heat the amine solution even when the solution is normally a liquid to decrease the viscosity of the solution and thereby facilitate spreading of the solution on the clap particles. It may also be desirable to heat the clay before incorporation of the amine solution. Good results in uniformly coating the clay can be brought about using the above technique without using spraying equipment.

The free moisture content of the coated clay should be from 0% to about 1% by weight.

Pure aliphatic amines of the formula $RNH_2$ (wherein R is an aliphatic radical containing 8 to 22 carbon atoms) can be used singly or in combination in carrying out this invention, and the aliphatic radical of the amines can be saturated or unsaturated. Representative pure amines include octylamine, decylamine, decenylamine, octadecylamine, and octadecenylamine. Preferred amines are commercial mixtures obtained from hydrolysis of animal and vegetables oils, such as coconut oil, soybean oil, tallow, cottonseed oil, followed by ammonolysis, dehydration and hydrogenation. The resultant amines consist predominately of mixtures of saturated and unsaturated primary n-aliphatic amines containing from 12 to 18 carbon atoms, depending upon the oil that is employed as a starting material. At present it is believed that optimum conditioning of high nitrogen analysis mixed fertilizer granules and ammonium nitrate prills is obtained with n-aliphatic primary amines in which the aliphatic groups consist for the most part of a mixture of $C_{16}$ and $C_{18}$ hydrocarbons, e.g., amines from soybean oil and tallow.

Examples of suitable oily solvents that are useful in making up the clay coating are hydrocarbons, such as, for example, mineral oil, kerosene and pine oil. With some amines, the oily solvent for the amines can be a hydrocarbon which also contains polar groups, such as, for example, fatty nitriles which are obtained by ammonolysis and dehydration of fatty acids from vegetable and animal oils of the type described above.

As mentioned, a noncatonic (i.e., nonionic or anionic) surface active agent is optionally dissolved in the oil. As examples of suitable nonionic agents may be mentioned: condensation products of fatty acids with ethylene oxide having fatty chains of 12 to 18 carbon atoms and polyethylene oxide chains of 220 to 2200 molecular weight; condensation products of primary n-aliphatic amines with ethylene oxide having fatty chains of 12 to 18 carbon atoms and polyethylene oxide chains of 220 to 2200 molecular weight. Mahogany sulfonates are representative of oil-compatible anionic surface active agents.

The coated clay conditioning agent is useful in conditioning granular and semigranular particles of mixed fertilizer salts or single fertilizer salts. The coated clay has been found to be especially useful in preventing caking of very soluble high nitrogen analysis fertilizer salts, e.g., ammonium nitrate and mixed fertilizers, such as 10–10–10, 12–0–12 and 14–0–14 grades. The conditioning agent should also be effective in preventing caking of urea granules. An additional advantage of the conditioning agent is that it will not sensitize ammonium nitrate, as will many organic materials, and therefore, will not cause the nitrate to detonate by accident. Optimum benefits of this invention are realized in conditioning soluble high nitrogen analysis salts which have a free moisture content in excess of about 0.5% inasmuch as it is extremely difficult to prevent caking of these materials with known anticaking agents. The term "free moisture" or "F.M." refers to the weight percentage of a material that is eliminated by heating the material to essentially constant weight at 220° F.

To condition hygroscopic granules against caking with the coated clay conditioning agent, the granules are dry tumbled with a suitable quantity of sodium montmorillonite clay which has been previously coated with an oily amine solution. Tumbling is carried out for a time sufficient for a uniform layer of the precoated clay crystals to accumulate on surfaces of the granules. Tumbling may be at room temperature although it is preferable to treat the granules while they are hot from the drying operations. A convenient point in the fertilizer manufacturing process to apply the conditioning agent is immediately after the screening step before cooling.

The coated clay particles are used in amounts within the range of about 5 to about 40 lbs./ton of fertilizer granules, and usually in amount within the range of 10 to 30 lbs./ton. When employed in amount less than about 10 lbs./ton the agent may lose some of its effectiveness and may not provide adequate cake resistance for most applications. On the other hand, use of more than about 30 lbs./ton of the coated clay may be prohibitive from an economic standpoint. Excellent results have been realized using the coated clay of this invention in amount such as to incorporate only 0.3 pound of amine per ton of ammonium nitrate prills, e.g., 20 lbs./ton of coated clay particles containing amine in amount of 1½% by weight. The optimum quantity of conditioning agent will vary with the nature of the fertilizer granules and the particle size of the granules as well as with the extent of anticaking that is required of the conditioned granules.

It is also within the scope of this invention to further treat the conditioned fertilizer particles with an additional powdered mineral agent to improve the flow of the conditioned fertilizer particles, since the clay agent of this invention functions principally as an anticaking agent and does not improve to an appreciable extent the ease of flow of the fertilizer particles (as measured by the agle of repose of poured granules). Thus, after initially dusting fertilizer granules with sodium montmorillonite containing sorbed oily amine solution, in accordance with this invention, other additives which are effective in improving the ease of flow of the precoated granules (such as calcined attapulgite clay) can then be dusted on the granules.

The following examples are given to contribute to a more full understanding of the present invention and to demonstrate the superiority of the novel clay conditioning agent of this invention over a variety of prior art conditioning agents.

PREPARATION OF COATED CLAY SAMPLES

In coating clay with solutions of fatty amine in oil, the following procedure was used. A previously formed amine solution was heated to about 220° F. and the warm solution was slowly metered onto the clay in a pulverizing mill. Following are formulations of coating compositions employed.

CLAY COATING COMPOSITIONS

| | Ingredients | Weight percent |
|---|---|---|
| | FORMULATION A | |
| Fatty amine mixture #1 | Mixed n-aliphatic monamines consisting predominantly of unsaturated $C^{18}$ amines and also containing $C^{16}$ amines. | 40 |
| | Mineral oil | 59 |
| | Nonionic surfactant [1] | 1 |
| | FORMULATION B | |
| Fatty amine mixture #2 | Consisting of about 2% tetradecylamine, 24% hexadecylamine, 71% octadecylamine and 3% octadecadienylamine. | 30 |
| | Mineral oil | 69 |
| | Nonionic surfactant [1] | 1 |

[1] Condensation product of about 10 mols ethylene oxide with 1 mol of a mixture of fatty acids containing 50% oleic acid, 40% linoleic acid, 5% linolenic acid and 5% rosin acids.

CONDITIONING OF FERTILIZERS

All granular fertilizers were conditioned with organophilic clays and mineral dusts by mixing the conditioning agent with granules in a rotary drum at room temperature.

DESCRIPTION OF TESTS CARRIED OUT WITH CONDITIONING AGENTS

*Percent adhesion.*—100 g. sample of prills coated with conditioner are placed on 60 mesh (Tyler series) screen and gently shaken for 30 seconds. The T/60 dust is collected, dried and weighed and reported as percent of the conditioner used.

*Dustiness index.*—The test method uses a standard dust chamber which provides for the recovery of dust from a sample submitted to standard "dusting" conditions. The tester is an adaptation of a device described in ASTM Standard Method No. D-547-41. The sample under test is suddenly released from a platform and permitted to fall through a rectangular chamber (8⅛″ x 8⅛″ cross-sectional area) for a distance of 32″ into a drawer receptacle. Five seconds after the sample is dropped, a polished chromium-plated dust collector tray is inserted into the column 25″ below the point of release so as to intercept and retain falling particles that may be above that point at time of insertion. Dustiness, expressed as g./ton, is determined from amount of dust collected when a 100 gram sample is allowed to fall and is calculated as follows: Wt. of dust (in mg.) of 100 g. sample×9.08.

*Caking (lever caking tester).*—A 125 cc. sample with an adjusted F.M. of 1.0% is placed in a sealed paper bag and the bag placed under a pressure of 6 lbs./in.² for 7 days. During the 7 days, the samples in the press are heated to 90° F. for 8 hours and cooled to 75° F. for 16 hours to pass the prills through the $NH_4NO_3$ transition point.

Sample ratings are as follows:

a—flowable
b—few friable lumps
c—few hard lumps
d—mostly hard lumps
e—hard cake
f—very hard cake A rating of "c" or better in this test is considered to be indicative of an acceptable conditioner.

*Example I*

Experiments were carried out to demonstrate that Wyoming bentonite (sodium montmorillonite) is markedly superior to a wide variety of silicate minerals, including calcium montmorillonite, as a carrier for an oil solution of fatty amine in the production of an anticaking agent.

Samples of various minus 325 mesh minerals were coated with 5% by weight of each of coating formulations A and B, the compositions of which are described above. The method for applying coatings is also described above.

All coated minerals were applied to ammonium nitrate prills in the amount of 1% (20 lbs./ton of granules). The F.M. of all coated prills was adjusted to 1% before testing for caking in the lever caking tester. Results are summarized in Table I.

Data in Table I show that of the various common clays investigated as a carrier for the oil solution of fatty amine, only the sodium montmorillonite clay (Samples No. 1 and 2) effectively conditioned the ammonium nitrate prills at the 1% moisture level. The data show that the coated calcium montmorillonite (Samples No. 3 and 4) were unsuitable. Of the various nonclay minerals, all of which have been suggested in the prior art as agents to prevent caking of various hygroscopic salts, none was satisfactory as a carrier for the oil solution of amine.

*Example II*

Experiments were conducted to determine whether the ammonium nitrate prills having a 1% moisture content could be conditioned with 2% (40 lbs./ton) of powdered diatomaceous earth (Sample No. 16) or powdered calcined attapulgite clay (Sample No. 17), commercial mineral anticaking agents. When subjected to the lever caking tests, prills coated with these minerals rated "f," indicating that Samples No. 16 and 17 were ineffective.

Experiments were also carried out to compare the effectiveness of coated sodium montmorillonite clays of this invention (Samples Nos. 1 and 2) as conditioning agents for ammonium nitrate prills with commercial onium bentonite clays and other commercial organophilic clays.

Results in Table II show that none of the organophilic clays, including onium clays, was nearly as effective as an anticaking agent for the ammonium nitrate prills at 1% F.M. level as the coated clays of this invention (Samples Nos. 1 and 2) which rated "b" in the caking test. Sample No. 18 (clay coated with octylamine acetate with no oily solvent) and Sample No. 19 (kaolin coated with rosin amine stearate), organophilic kaolin clays outside the scope of this invention, were comparatively ineffectual, rating "e" and "d," respectively. Onium bentonite clay conditioners of the prior art (Samples No. 21 to 23) rated "e" or "f." Of the various organophilic clay conditioners tested, only kaolin coated with magnesium stearate (Sample No. 20) matched the excellent adhesion properties of coated clay of this invention. However, the magnesium stearate coated clay was ineffective in restricted caking, as evidenced by the rating of "d." The data show that the adhesion of onium bentonite clays (Samples No. 21 to 23) was extremely poor as compared with the dry coated bentonite clays of this invention.

TABLE I.—EFFECT OF MINERAL CARRIERS FOR AMINE-OIL SOLUTIONS ON CONDITIONING OF NH$_4$NO$_3$ PRILLS (1% MOISTURE CONTENT)

| Conditioner Sample No. | Conditioner composition | | | Percent conditioner | Caking test [1] | |
|---|---|---|---|---|---|---|
| | Mineral carrier | Wt. percent | Amine-oil formulation | Wt. percent | Results | Rating |
| 1 | Na montmorillonite | 95 | A | 5 | 1 | Few friable lumps | b. |
| 2 | ----do---- | 95 | B | 5 | 1 | ----do---- | b. |
| 3 | Ca montmorillonite | 95 | A | 5 | 1 | Hard cake | e. |
| 4 | ----do---- | 95 | B | 5 | 1 | ----do---- | e. |
| 5 | Calcined fluid energy milled attapulgite clay. | 95 | A | 5 | 1 | Few friable lumps | e. |
| 6 | ----do---- | 95 | B | 5 | 1 | Hard cake | e. |
| 7 | Sepiolite clay | 95 | A | 5 | 1 | ----do---- | e. |
| 8 | ----do---- | 95 | B | 5 | 1 | ----do---- | e. |
| 9 | Pyrophyllite | 95 | A | 5 | 1 | Hard lumps | d. |
| 10 | ----do---- | 95 | B | 5 | 1 | ----do---- | d. |
| 11 | Gypsum | 95 | A | 5 | 1 | Hard cake | f. |
| 12 | ----do---- | 95 | B | 5 | 1 | ----do---- | f. |
| 13 | Limestone | 95 | A | 5 | 1 | ----do---- | e. |
| 14 | ----do---- | 95 | B | 5 | 1 | ----do---- | e. |
| 15 | None | 95 | | | | Very hardcake | f. |

[1] Caking test run in lever caking tester; F.M. adjusted to 1% before testing.

TABLE II.—EFFECT OF CONDITIONING AGENTS ON ADHESION AND CAKING OF NH$_4$NO$_3$ PRILLS

| Conditioner Sample No. | Conditioner Composition | Percent | Percent adhesion (all samples at about 0.50% F.M.) | Dustiness Index, g./ton | Caking results* | Rating |
|---|---|---|---|---|---|---|
| | CLAY COMPOSITIONS OF SUBJECT INVENTION | | | | | |
| 1 | Na montmorillonite dry coated with 5% Formulation A. | 1 | 86.8 | 52.1 | Few friable lumps | b. |
| 2 | Na montmorillonite dry coated with 5% Formulation B. | 1 | 87.5 | 17.0 | ----do---- | b. |
| | ORGANOPHILIC CLAYS OUTSIDE SCOPE OF SUBJECT INVENTION | | | | | |
| 18 | 98% 4.8 micron kaolin dry coated with 2% octylamine acetate. | 1 | 73.0 | 73.5 | Hard cake | e. |
| 19 | 98% 4.8 micron kaolin dry coated with 2% rosin amine D stearate. | 1 | 79.0 | 56.3 | Many hard lumps | d. |
| 20 | 99% 0.5 micron kaolin dry coated with 1% magnesium stearate. | 1 | 90.0 | 12.7 | Hard cake | e. |
| 21 | Bentone 18 [1] | 1 | 44.0 | 114.0 | Very hard cake | f. |
| 22 | Bentone 27 [2] | 1 | 44.0 | 282.0 | ----do---- | f. |
| 23 | Bentone 34 [3] | 1 | 42.0 | 208.0 | Hard lumps | d. |

[1] Octadecylammonium bentonite. [2] Heptadodecylammonium bentonite. [3] Dimethyldioctadecylammonium bentonite.

*Caking test run in lever caking tester; F.M. adjusted to 1% before testing for caking.

We claim:

1. In the conditioning of particles of hygroscopic salt material against caking with a primary n-aliphatic amine having from 8 to 22 carbon atoms, said particles comprising a water-soluble salt of nitrogen, the improvement which consists in
    coating the surface of said particles of hygroscopic salt material with a small amount of dry, minus 325 mesh particles of sodium montmorillonite the surface of which contain a small amount of a solution of said amine in an oily solvent selected from the group consisting of a hydrocarbon oil and fatty acid nitrile.

2. Sodium montmorillonite particles coated with from about 1% to 10% by weight of an n-aliphatic primary amine containing 8 to 22 carbon atoms and an inert oily solvent for said amine, said oily solvent being selected from the group consisting of a hydrocarbon oil and a fatty acid nitrile containing from 12 to 18 carbon atoms.

3. The product of claim 2 in which said sodium montmorillonite particles are coated with from about 2% to 8% by weight of said amine and said oily solvent, and said amine contains from 16 to 18 carbon atoms.

4. The product of claim 2 in which said amine is present in amount of 15 to 85 parts by weight to 85 to 15 parts by weight of said oily solvent.

5. The product of claim 2 in which said sodium montmorillonite particles are coated with from about 3% to 6% by weight of said oily solvent and said amine, and said amine is a mixture of primary n-aliphatic amines having 16 to 18 carbon atoms and is present in amount of 30% to 60% of the combined weight of said oily solvent and said amine.

6. The product of claim 5 which contains from 0% to 3%, based on the weight of said mixture of amines, of a polyethoxyester of a fatty acid having 12 to 18 carbon atoms and having polyethylene oxide chains of 220 to 2200 molecular weight.

7. The product of claim 5 in which said oily solvent is mineral oil.

8. In the conditioning of granular ammonium nitrate particles against caking with an n-aliphatic primary amine having from 8 to 22 carbon atoms, the improvement which consists in coating the surfaces of said particles with a small amount of sodium montmorillonite coated with from about 1% to 10% by weight of an n-aliphatic primary amine containing 8 to 22 carbon atoms and an inert oily solvent for said amine, said oily solvent being selected from the group consisting of a hydrocarbon oil and a fatty acid nitrile containing from 12 to 18 carbon atoms.

(References on following page)

References Cited by the Examiner

UNITED STATES PATENTS

| | | | |
|---|---|---|---|
| 2,320,009 | 5/1943 | Ralston et al. | 106—72 |
| 2,531,396 | 11/1950 | Carter et al. | 106—72 |
| 2,535,647 | 12/1950 | Millman et al. | 160—72 |
| 2,690,389 | 9/1954 | Studebaker | 71—64 |
| 2,702,747 | 2/1955 | Studebaker | 71—64 |
| 2,761,835 | 9/1956 | Brown | 106—72 |
| 2,797,196 | 6/1957 | Dunn et al. | |
| 2,815,292 | 12/1957 | Thiele | 106—72 |
| 2,948,632 | 8/1960 | Albert et al. | 106—72 |
| 2,982,665 | 5/1961 | Wilcox | 106—308 |
| 3,034,858 | 5/1962 | Vives | 71—64 |
| 3,041,159 | 6/1962 | Smith | 71—64 |
| 3,050,385 | 8/1962 | Parker | 71—64 |

DONALL H. SYLVESTER, *Primary Examiner.*

ANTHONY SCIAMANNA, *Examiner.*